C. FISHER.
Road-Scrapers.
No. 148,816. Patented March 24, 1874.
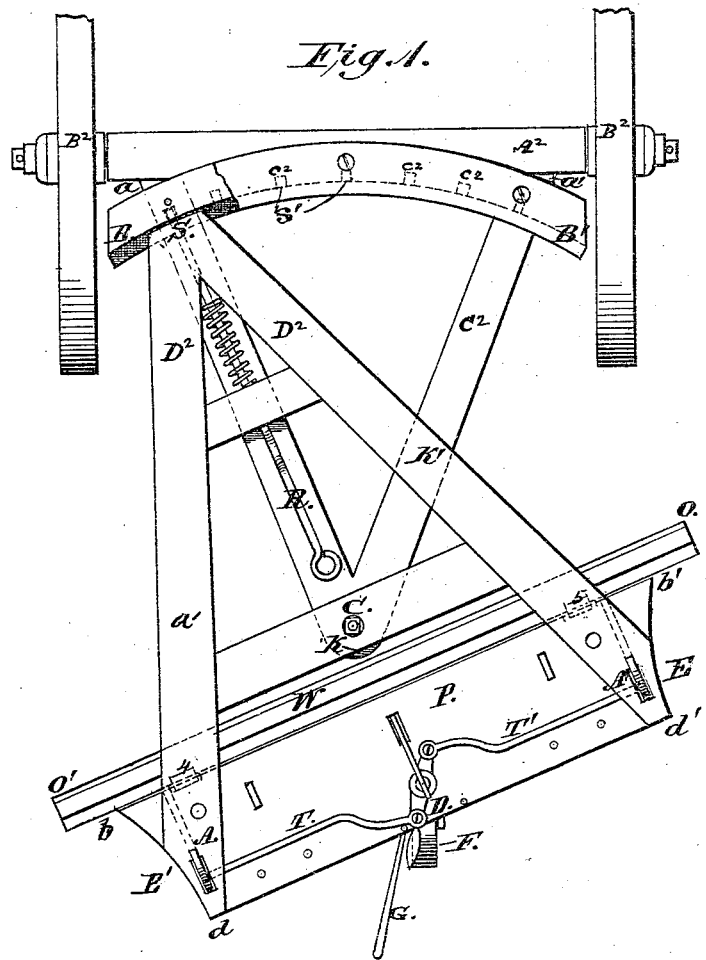
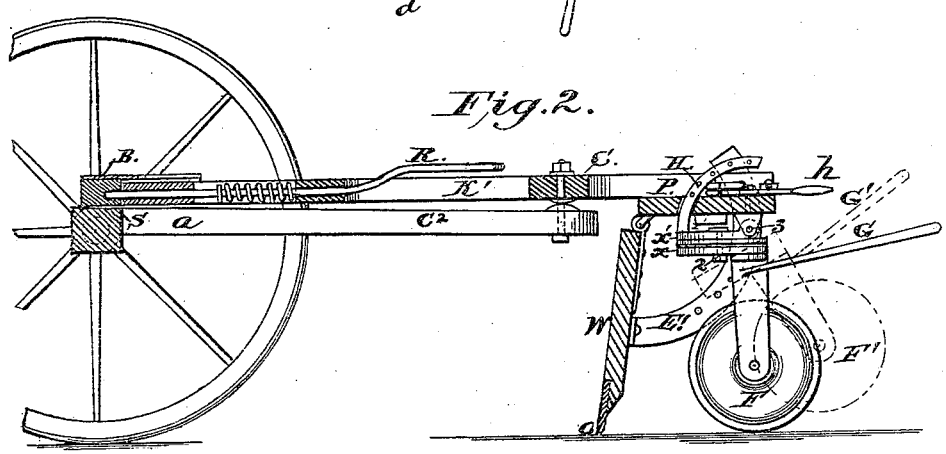
Witnesses.
Lucius B Wright,
Walter S Spalding.
Inventor:
Charles Fisher.

UNITED STATES PATENT OFFICE.

CHARLES FISHER, OF WALPOLE, NEW HAMPSHIRE.

IMPROVEMENT IN ROAD-SCRAPERS.

Specification forming part of Letters Patent No. 148,816, dated March 24, 1874; application filed July 11, 1873.

*To all whom it may concern:*

Be it known that I, CHARLES FISHER, of Walpole, of the county of Cheshire and State of New Hampshire, have invented a new and useful Improvement in Road-Scrapers; and do hereby declare the same to be fully described in the following specification, and represented in the accompanying drawings, of which—

Figure 1 is a top view, and Fig. 2 a longitudinal section, of a road-scraper provided with my invention.

Such invention consists in the combination of a flanged supporting-arc, (furnished with bolt-recesses,) two triangular frames, and a bolt with an axle and wheels, and a scraper and its support-platform, all being arranged, constructed, and applied, substantially in the manner hereinafter described; also, in the caster-wheel of the scraper-platform, combined with such platform by means not only of a plate hinged to it, but by a curved arm, extended from such plate and through the platform, all as hereinafter set forth; also, in the scraper, hinged to its platform and provided with adjusting and supporting arms and bolting mechanism, all as hereinafter explained.

In such drawings, the flanged supporting-arc is shown at B as fastened to the axle $A^2$, provided with two wheels, $B^2 B^2$. There extends from the axle and the arc B two bars, $a$ $a'$, they being united together at their rear ends, so as, with the axle, to constitute a triangular frame, $C^2$, which extends underneath in the manner shown. A triangular frame, $D^2$, is connected thereto by a transom-bolt, C, going down through the two, and two convex bearings, shown at $A^2$ in Fig. 2. A bolt, R, provided with a spring to set it forward, applied or arranged with the frame $D^2$, as shown, operates with the arc B, which is furnished with a series of bolt-receiving recesses, $C^2$, arranged in it at equal distances apart, they being represented in Fig. 1 by dotted lines. The arc B, whose radius has its center at C, is flanged, to extend over the front end of the frame $D^2$. Such frame $D^2$, at its rear, extends over and is bolted to a platform, P, to whose front edge a scraper, W, is hinged, such scraper being extended down from the platform in the manner shown. From such scraper two quadrantal arms, E', project up through slots $A^1 A^1$ in the platform, each of such arms being provided with a series of holes, to receive one of a pair of bolts, T T', pivoted to the opposite ends of a lever, D. (See Fig. 1.) A handle, $h$, (see Fig. 2,) projects from the lever D. By means of the handle, the lever may be moved so as to withdraw the bolts from the said arms, or force the bolts into them. A caster-wheel, F, arranged underneath the platform P, has the head-plate $x$ of its supporting-frame pivoted, by means of a bolt, $z'$, to a plate, $x'$, which is hinged at its rear edge to the platform, and at its front is provided with a quadrantal arm, H, (see Fig. 2,) to extend up through the platform P, which may be provided with a bolt or pin to go through the arm, in order to hold the head of the caster-wheel in position, horizontal or inclined. A handle, G, extending from the caster-wheel frame, serves to enable a person to turn the caster-wheel, or to tip it into the position shown in Fig. 2, at F', by dotted lines.

The object of applying the caster-wheel to the platform in manner described, is to enable the scraper to be raised entirely off the road-surface, or to allow it to penetrate such, as circumstances may require, the caster-wheel, with the wheels of the axle, serving to support the machine on the ground when the scraper may not be at work, or is raised off it.

From the above it will be seen that, by means of the recessed and flanged arc, the bolt, and the two triangular frames connecting the axle with the scraper, the latter may be adjusted either in parallelism with the axle, or at the proper inclination, either way, to scrape a road-surface toward the longitudinal medial line thereof.

As the blade at or near its advanced end does the greater portion of the work of scraping up the earth, and as, in order for it to discharge the dirt freely, such blade must stand perpendicularly, or nearly so, to the surface being scraped, the weight or power to force the blade into the ground is obtained to the best advantage by arranging the pivot C as near to the blade as possible.

I claim as my invention as follows, viz:

1. The flanged and bolt-recessed arc B, the two triangular frames $C^2 D^2$, the bolt C, the axle $A^2$ and its wheels, and the scraper W and its support-platform P, combined, arranged, and applied substantially as, and to operate as set forth.

2. The caster-wheel F, combined with the platform P by means of the plate $x'$, and the curved arm H applied to the platform, as specified.

3. The scraper W, hinged to the platform P, and provided with curved arms E' E' and bolts T T', for adjusting such scraper, all as set forth.

CHARLES FISHER.

Witnesses:
HENRY A. HITCHCOCK,
LUCIUS B. WRIGHT,
WALTER S. SPALDING.